(12) United States Patent
Clinton et al.

(10) Patent No.: US 8,516,193 B1
(45) Date of Patent: Aug. 20, 2013

(54) TECHNIQUES FOR CONTENT-BASED CACHING IN A COMPUTER SYSTEM

(75) Inventors: John Clinton, Sharon, MA (US); Timothy Joseph Martel, Lexington, MA (US); Bachir Mohamed Berrachedi, Watertown, MA (US)

(73) Assignee: Pegasystems Inc., Cambridge, MA (US)

( * ) Notice: Subject to any disclaimer, the term of this patent is extended or adjusted under 35 U.S.C. 154(b) by 810 days.

(21) Appl. No.: 12/590,454

(22) Filed: Nov. 6, 2009

Related U.S. Application Data

(63) Continuation-in-part of application No. 11/396,415, filed on Mar. 30, 2006, now abandoned, which is a continuation-in-part of application No. 12/035,682, filed on Feb. 22, 2008, now abandoned, which is a continuation-in-part of application No. 12/174,624, filed on Jul. 16, 2008.

(51) Int. Cl.
*G06F 12/00* (2006.01)

(52) U.S. Cl.
USPC ........... 711/118; 711/133; 711/159; 711/108; 706/47; 709/217

(58) Field of Classification Search
USPC ................... 711/118, 133, 159, 108; 706/47; 703/3; 726/30; 709/217
See application file for complete search history.

(56) References Cited

U.S. PATENT DOCUMENTS

| | | | |
|---|---|---|---|
| 5,826,250 A | 10/1998 | Trefler | |
| 6,807,632 B1 | 10/2004 | Carpentier et al. | |
| 7,398,391 B2 | 7/2008 | Carpentier et al. | |
| 7,415,731 B2 | 8/2008 | Carpentier et al. | |
| 7,526,481 B1 * | 4/2009 | Cusson et al. | 1/1 |
| 7,640,222 B2 | 12/2009 | Trefler | |
| 7,818,506 B1 * | 10/2010 | Shepstone et al. | 711/133 |
| 2003/0115281 A1 * | 6/2003 | McHenry et al. | 709/213 |
| 2006/0080401 A1 * | 4/2006 | Gill et al. | 709/217 |
| 2007/0233902 A1 | 10/2007 | Trefler et al. | |
| 2008/0208785 A1 | 8/2008 | Trefler et al. | |
| 2009/0018998 A1 * | 1/2009 | Patten et al. | 707/3 |
| 2009/0132232 A1 | 5/2009 | Trefler | |

* cited by examiner

*Primary Examiner* — Hong Kim
(74) *Attorney, Agent, or Firm* — Muirhead and Saturnelli, LLC

(57) ABSTRACT

Described are techniques for data processing and caching. In response to a client failing to retrieve contents of a data element from a cache location specified by a first data element identifier including a first content-based identifier, the contents of the data element are obtained and stored at a cache location specified by the first data element identifier. The contents of the data element are updated at a second point in time and stored as second contents in the data element source. The data element at the second point in time has a second content-based identifier. In response to the client failing to retrieve the second contents of the data element from a cache location specified by a second data element identifier including the second content-based identifier, the second contents of the data element are obtained and stored at a cache location specified by the second data element identifier.

32 Claims, 4 Drawing Sheets

TECHNIQUES FOR CONTENT-BASED CACHING IN A COMPUTER SYSTEM

CROSS-REFERENCE TO RELATED APPLICATIONS

Each of the following U.S. patent applications is incorporated by reference in its entirety: U.S. patent application Ser. No. 11/396,415, filed Mar. 30, 2006 now abandoned, entitled "User Interface Methods and Apparatus for Rules Processing", U.S. patent application Ser. No. 12/035,682, filed Feb. 22, 2008 now abandoned, entitled "User Interface Methods and Apparatus for Rules Processing" and U.S. patent application Ser. No. 12/174,624, filed Jul. 16, 2008, entitled "Methods And Apparatus For Implementing Multilingual Software Applications."

FIELD OF INVENTION

This application relates to digital data processing and, more particularly, to optimizing the performance and accuracy of a computer system through improved data processing and caching techniques. The techniques described herein have application, by way of non-limiting example, to enabling static and dynamic data processing in a rules-based environment and efficiently maintaining linkages between such data.

BACKGROUND

The speed at which computer systems operate is a critical factor in determining the suitability of such systems to perform mission critical tasks. In typical enterprise-wide computer systems where multiple computers communicate by way of a network (such as a WAN or the Internet), one factor that greatly impacts the speed and overall performance of the system is the amount of information that needs to be transmitted across the network. Since repeatedly fetching data across a network or re-computing data can be expensive, computer systems utilize various caching techniques to re-use information as much as possible. Such techniques can help reduce bandwidth and processing requirements of the computer systems, as well as help improve responsiveness for end users.

Cache memory in computer systems is a type of fast-access memory that is typically used to temporarily store certain type of information for rapid access. Such information typically comprises data that is any of frequently requested, slow to access, and permanently stored in slower-access memory, such as a magnetic disk or other direct access storage device (DASD). In a typical network session where a user or application is interacting with a server through a client computer over a network, the client will first check its local cache memory for the desired data before requesting it to be retrieved from the server. If the data is stored in cache, the client computer can access the information locally a lot faster than retrieving it from the server.

A shortcoming of such traditional caching techniques is the difficulty to manage copies of data in an environment where the data stored on the server changes frequently. Consider the example of a software development company where teams of onshore/offshore developers and quality assurance engineers may be simultaneously updating and accessing the same data on application development servers located in geographically disparate locations. In such situations, the cache memory for the clients and/or development servers may have to be refreshed periodically in order to ensure that the cached data reflects the latest set of changes made on the application development servers. Current caching techniques allow presetting of the cache expiration period based upon several factors, such as, business requirements, type of data being cached and the nature of the underlying computer system. However, this does not solve the problem of slow server response times due to frequent cache memory refreshment.

Another technique for improving network performance is to place more caches in the network thereby alleviating server load. However, this technique results in a more complex network configuration and higher costs. Furthermore, existing approaches, including placing more caches in the network, do not provide ways to efficiently maintain linkages between the various types of data in computer systems where content may be generated both statically and dynamically and certain data may contain references to other data. Optimizing caching by placing more caches in the network in such computer systems is especially difficult because copies of referenced data may be placed in different locations on the network and the references to such data need to be dynamically updated in order to redirect the client to the proper location.

Accordingly, there remains a need for techniques for improving the performance and accuracy of a computer system where the data is any of interlinked, dynamically generated and frequently updated.

SUMMARY OF THE INVENTION

In accordance with one aspect of the invention is a computer implemented method for caching. First processing is performed in response to a client failing to retrieve contents of a data element from a cache location specified by a first data element identifier including a first content identifier determined based upon the contents of the data element at a first point in time. The first processing includes obtaining the contents of the data element from a data element source and storing the contents of the data element at a cache location specified by the first data element identifier. The contents of the data element are updated at a second point in time and second contents of the data element at the second point in time are stored in the data element source. The data element at the second point in time has a second content identifier determined based on the second contents of the data element at the second point time. Second processing is performed in response to the client failing to retrieve the second contents of the data element from a cache location specified by a second data element identifier including the second content identifier. The second processing includes obtaining the second contents of the data element from the data element source and storing the second contents of the data element at a cache location specified by the second data element identifier. Third processing may be performed each time the client fails to retrieve contents for a version of the data element from a cache location specified by an associated data element identifier. The third processing may comprise obtaining contents for said version of the data element from the data element source, and storing the contents for the version at the cache location specified by the associated data element identifier, wherein the associated data element identifier includes an associated content identifier determined based upon the contents of the version of the data element. The method may also include storing, at the first point in time, the contents of the data element and associated metadata including at least the first content identifier, forming the first data element identifier including the first content identifier in response to receiving a request from the client, and sending a data stream including at least the first data element identifier to said client, wherein said sending occurs prior to the client failing to retrieve the contents of the data element from a cache location specified by the first data element identifier. The associated metadata may include a file name and the first data element identifier may be a file path containing the file name. At least the first data element identifier may include a portion determined using context information associated with a received request from the client, said first data element identifier being included in a data stream generated in response to the received request. The context information may include at least one of a user property associated with a user on behalf of which the received request is issued, a device property associated with a device from which the received request is issued, and a communication channel property. The user property may be any of security permissions, a disability setting, and locale of the user. The device property may be any of processor speed, display size, and a keyboard capability. The communication channel property may be a property of a channel over which the received request is transmitted and may include any of connection speed and connection type between any of the device, the data element source and the cache location. The data element source may be a storage location on a server. At least the first content identifier may be a hash value based on the contents of the data element at the first point in time.

In accordance with another aspect of the invention is a computer-implemented method for processing requests received by a server. At a first point in time in response to receiving a request from a client, one or more rules are processed using a rules engine executing on the server. As a result of processing the one or more rules, a data stream is generated including a first data element identifier for a data element referenced by the one or more rules, wherein the first data element identifier includes a first content identifier determined based upon contents of the data element at the first point in time. The data stream is transmitted to the client wherein the client subsequently attempts to obtain the data element from a cache location specified by the first data element identifier. First processing is performed in response to the client failing to obtain the contents of the data element from the cache location specified by the first data element identifier. The first processing includes retrieving the contents of the data element from a data element source, transmitting the contents of the data element to the client, and storing the contents of the data element at the cache location specified by the first data element identifier. The contents of the data element are updated at a second point in time and stored as second contents of the data element at the second point in time in the data element source. The data element at the second point in time has a second content identifier determined based on the contents of the data element at the second point time. Second processing is performed in response to the client failing to obtain the second contents of the data element from a cache location specified by a second data element identifier including the second content identifier. The second processing includes retrieving the second contents of the data element from the data element source, transmitting the second contents of the data element to the client, and storing the second contents of the data element at the cache location specified by the second data element identifier. Metadata associated with the data element may be stored in the data element source along with the contents of the data element. The metadata associated with the data element may include a file name, and any of the first and second data element identifiers may be a file path containing the file name. The data element at the first point in time may include a reference to a second data element where the reference specifies a third data element identifier including a third content identifier determined based upon contents of the second data element at the first point in time. The method may also include performing third processing in response to the client failing to obtain the contents of the second data element from a cache location specified by the third data element identifier. The third processing may include retrieving the contents of the second data element from the data element source, transmitting the contents of the second data element to the client, and storing the contents of the data element at the cache location specified by the third data element identifier. If the contents of the second data element are modified at a particular point in time, the third content identifier and the third data element identifier may accordingly change based on modifications to the contents of the second data element at the particular point in time. The third content identifier may not change despite updating the contents of the data element at the second point in time. At least one of the one or more rules may reference a content bundle, said content bundle referencing a plurality of data elements including said data element. Contents for each of the plurality of data elements may be stored in the data element source along with a corresponding content identifier determined based upon contents of said each data element at a particular point in time. Another content identifier may be associated with the content bundle where said another content identifier may have a value determined based upon contents of said plurality of data elements. If the contents of any one of said plurality of data elements are modified, said another content identifier may change accordingly along with the corresponding content identifier that is based upon the contents that are modified. The contents of the data element may comprise static contents. The data element source may comprise any of one or more content servers and edge servers. Any of the cache location specified by the first data element identifier and the cache location specified by the second data element identifier may comprise locations on any of one or more content servers and edge servers. A first of said one or more content servers or edge servers may receive the request from the client and the processing at the first point in time may be performed by the server in response to the first of said one or more content servers or edge servers transmitting the request to the server. The server may comprise an application server. The application server may return the data stream to a first of said one or more content servers or edge servers and the data stream may then be transmitted to the client. At least a portion of the contents of the data element may be dynamically generated in response to the request from the client. The data element may be any of a script, an image file, a video file, and a cascading style sheet. The data stream may include contents of a web page. The web page may be associated with a web page content identifier determined based upon the contents of the web page when said data stream is generated. The web page may be stored at a cache location specified by a web page location identifier including said web page content identifier.

In accordance with another aspect of the invention is a computer implemented method for caching. At a first point in time, contents of a data element and associated metadata are stored at a data element source. The associated metadata includes a file name and a content identifier based upon the contents of the data element at the first point in time. It is determined whether the data element is stored at a cache location identified by a first data element identifier, the first data element identifier including the first content identifier and the file name. First processing is performed in response to determining that the data element is not stored at the cache location identified by the first data element identifier. The first processing includes obtaining the contents of the data element from the data element source and storing the contents of the data element at the cache location specified by the first data element identifier. The method may also include updating the contents of the data element at a second point in time; storing, at the data element source, updated contents of the data element at the second point in time and associated metadata including the file name and a second content identifier based on the contents of the data element at the second point in time; determining whether the data element is stored at a cache location identified by a second data element identifier, the second data element identifier including the second content identifier and the file name; and performing second processing in response to determining that the data element is not stored at the cache location identified by the second data element identifier, said second processing including obtaining the updated contents of the data element from the data element source and storing the updated contents of the data element at the cache location specified by the second data element identifier.

In accordance with another aspect of the invention is a computer readable medium comprising executable code stored thereon for data processing and caching. The computer readable medium comprises executable code stored thereon that: performs first processing in response to a client failing to retrieve contents of a data element from a cache location specified by a first data element identifier including a first content identifier determined based upon the contents of the data element at a first point in time, said first processing including obtaining the contents of the data element from a data element source and storing the contents of the data element at a cache location specified by the first data element identifier; updates the contents of the data element at a second point in time and stores second contents of the data element at the second point in time in the data element source, said data element at said second point in time having a second content identifier determined based on the second contents of the data element at the second point time; and performs second processing in response to the client failing to retrieve the second contents of the data element from a cache location specified by a second data element identifier including the second content identifier, said second processing including obtaining the second contents of the data element from the data element source, and storing the second contents of the data element at a cache location specified by the second data element identifier.

In accordance with another aspect of the invention is a computer readable medium comprising executable code stored thereon for processing requests received by a server. The computer readable medium comprises executable code stored thereon that: processes at a first point in time, in response to receiving a request from a client, one or more rules using a rules engine executing on the server; generates, as a result of processing the one or more rules, a data stream including a first data element identifier for a data element referenced by the one or more rules, wherein the first data element identifier includes a first content identifier determined based upon contents of the data element at the first point in time; transmits the data stream to the client wherein the client subsequently attempts to obtain the data element from a cache location specified by the first data element identifier; performs first processing in response to the client failing to obtain the contents of the data element from the cache location specified by the first data element identifier, said first processing including retrieving the contents of the data element from a data element source, transmitting the contents of the data element to the client, and storing the contents of the data element at the cache location specified by the first data element identifier; updates the contents of the data element at a second point in time and stores second contents of the data element at the second point in time in the data element source, said data element at said second point in time having a second content identifier determined based on the contents of the data element at the second point time; and performs second processing in response to the client failing to obtain the second contents of the data element from a cache location specified by a second data element identifier including the second content identifier, said second processing including retrieving the second contents of the data element from the data element source, transmitting the second contents of the data element to the client, and storing the second contents of the data element at the cache location specified by the second data element identifier.

In accordance with another aspect of the invention is a computer readable medium comprising executable code stored thereon for caching. The computer readable medium comprises executable stored thereon that: stores, at a first point in time, contents of a data element and associated metadata at a data element source, said associated metadata including a file name and a content identifier based upon the contents of the data element at the first point in time; determines whether the data element is stored at a cache location identified by a first data element identifier, the first data element identifier including the first content identifier and the file name; and performs first processing in response to determining that the data element is not stored at the cache location identified by the first data element identifier, said first processing including obtaining the contents of the data element from the data element source and storing the contents of the data element at the cache location specified by the first data element identifier.

BRIEF DESCRIPTION OF THE DRAWINGS

A more complete understanding of the invention may be attained by reference to the drawings, in which.

DETAILED DESCRIPTION

Figure 1:
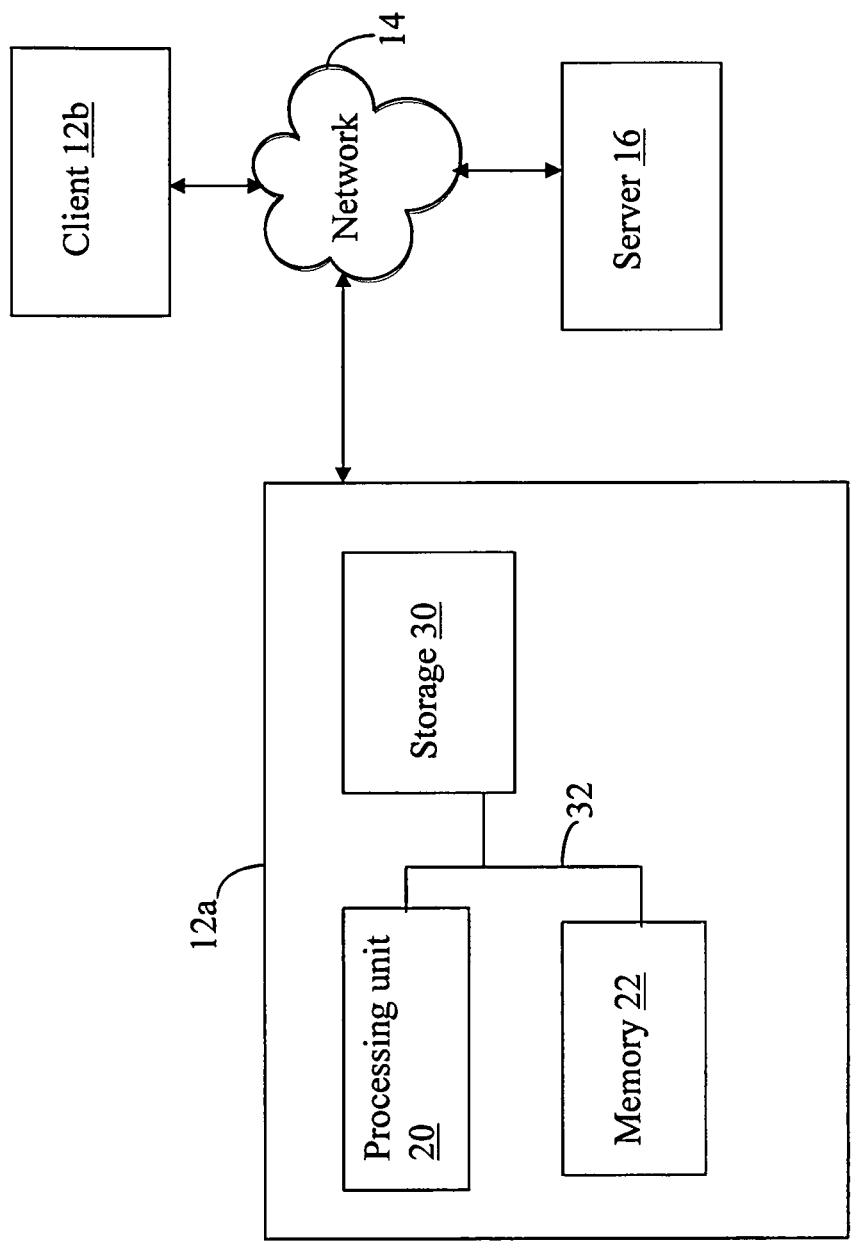
FIG. 1 depicts an exemplary digital data processing environment in which the techniques described herein may be utilized.

Referring to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, rules, objects, components, data structures, and the like, that perform particular tasks or implement particular abstract data types. Typically the functionality of the program modules may be combined or distributed as desired in various embodiments. As described below in more detail, one embodiment of the techniques herein may be implemented using rules-based programming and/or runtime environments.

Included in FIG. 1 are client computers 12a, 12b, a network 14, and a server 16. The computers 12a, 12b and server 16 may include a standard, commercially-available computer or a special-purpose computer that may be used to execute one or more program modules. Described in more detail in following paragraphs and figures is processing that may be performed by program modules executed by the computers 12a, 12b and server 16 in connection with using the techniques described herein. It will be appreciated by those skilled in the art that although the computers 12a, 12b and 16 are shown in the example as communicating in a networked environment, the foregoing components may communicate with other components utilizing different communication mediums. For example, the computer 12a may communicate with one or more components utilizing a network connection, and/or other type of link known in the art including, but not limited to, the Internet, an intranet, or other wireless and/or hardwired connection(s).

As illustrated in FIG. 1, the computer 12a may include one or more processing units 20, memory 22, storage 30, and a system bus 32 used to facilitate communications between the components of the computer 12a, as well as other components not illustrated in FIG. 1. The computer 12b and server 16 may also include components similar to those as illustrated and included in the computer 12a.

Depending on the configuration and type of computer 12a, memory 22 may be volatile (such as RAM), non-volatile (such as ROM, flash memory, etc.) or some combination of the two. Additionally, the computer 12a may also have additional storage (removable and/or non-removable) including, but not limited to, USB devices, magnetic or optical disks, or tape. Such additional storage is illustrated in FIG. 1 by storage 30. The storage 30 may include one or more removable and non-removable storage devices having associated computer-readable media that may be utilized by the computer 12a. The storage 30 in one embodiment may include a hard disk and/or CD-ROM drive. By way of example, and not limitation, memory 22 and storage 30 are examples of computer readable media. Computer readable media includes volatile and non-volatile, removable and non-removable media implemented in any method or technology for storage of information such as computer readable instructions, data structures, program modules or other data. Computer readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by the computer 12a. The foregoing media typically embodies computer readable instructions, data structures, program modules or other data.

The computer 12a may operate in a networked environment as illustrated in FIG. 1 using logical connections to remote computers, such as the server 16, through a network. One or more software modules and/or data files may be included in storage 30 of the computer 12a. During operation of the computer 12a, one or more of these modules included in the storage 30 may also reside in a portion of memory 22, such as, for example, RAM for controlling the operation of the computer 12a.

The server 16 may represent a server computer system connected to the network 14. The server computer system may include software modules to service requests and one or more processors, memory, storage, and the like, similar to that as described herein with respect to the computer 12a. As will be described in more detail in following paragraphs, the techniques herein may be used in an embodiment in which the computers 12a and 12b are client computers which communicate with the server 16 over the network 14. The computers 12a, 12b may include a web browser or other software for use in connection with rendering a user interface (UI) such as may be used in connection with viewing and performing other operations on data requested, and received from, the server 16. Each of the clients 12a, 12b may operate independently of each other in connection with performing different operations on data obtained from the server 16. The server 16 may utilize the techniques described herein in connection with performing processing and operations on instances of data structures, such as objects, as may be created and/or retrieved from a database on the server 16 in response to a request from one of the clients 12a, 12b.

Figure 2:
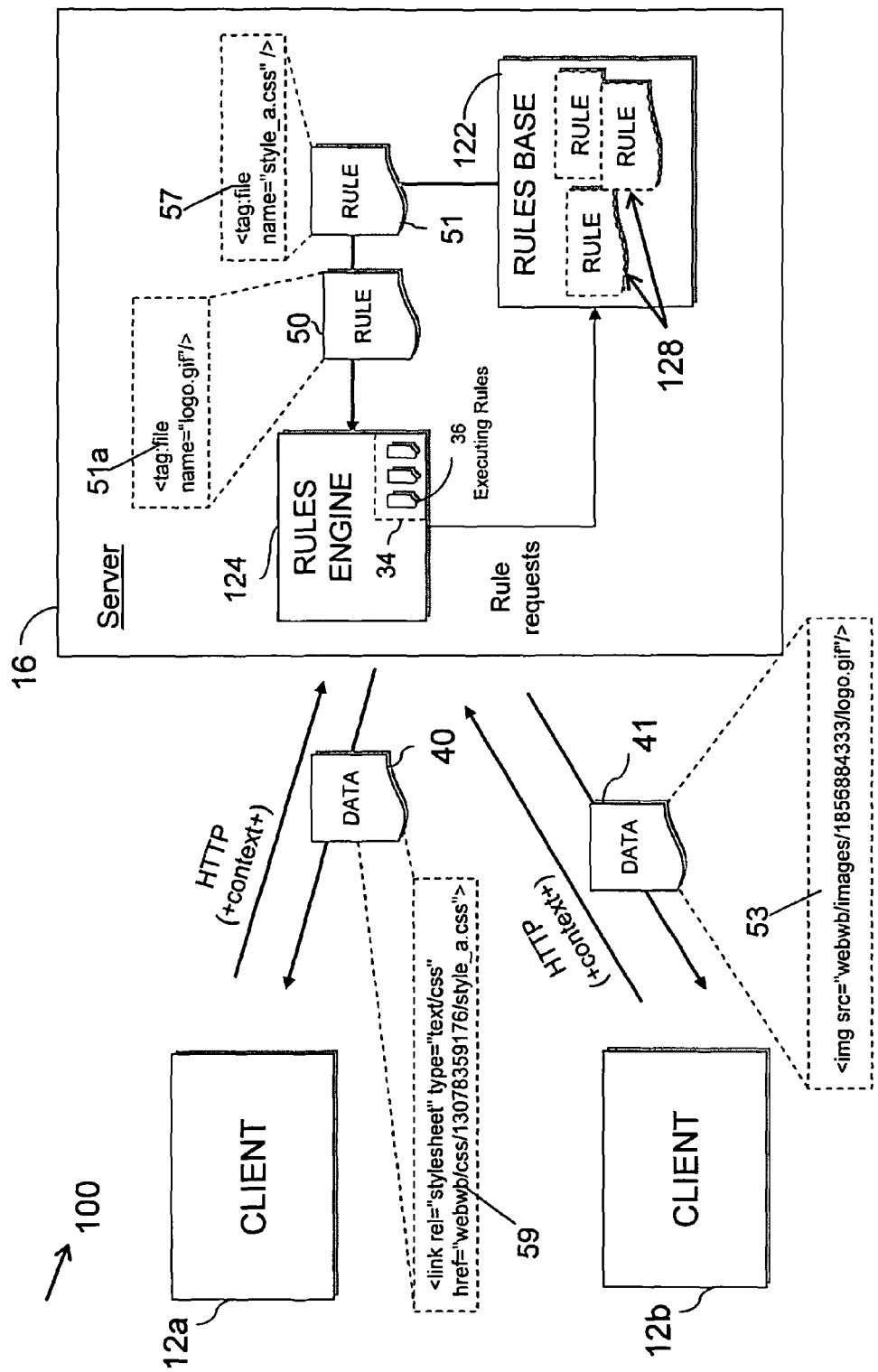
FIG. 2 depicts an exemplary communication that may occur during the execution of software applications in the digital data processing environment of FIG. 1.

Referring to FIG. 2, shown is an exemplary communication that may occur between clients 12a, 12b and the server 16 during the execution of software applications 34 (e.g., a multi-user enterprise application), according to one embodiment utilizing techniques described herein. In the illustrated example 100, server 16 includes a rules base 122 constructed and accessed in the conventional manner known in the art of rules bases. The digitally encoded rules 128 that it contains are likewise formatted and stored in the conventional manner known in the art. An example of the structure, operation and use of the rules base 122 and rules 128 is provided in commonly assigned U.S. Pat. No. 5,826,250, entitled "Rules Bases and Methods of Access Thereof" and U.S. patent application Ser. No. 11/368,360, filed Mar. 3, 2006, entitled "Rules Base Systems and Methods with Circumstance Translation," the teachings of both of which are incorporated herein by reference.

The server 16 also includes rules engine 124 of the type conventionally known in the art for use in processing rules, e.g., retrieved from a rules base 122, in order to respond to (or otherwise handle) events signaled to and/or detected by the engine 124. Moreover, the illustrated server 16 is shown as including both a rules engine and rules base. However, in other embodiments, multiple servers may be provided which may (or may not) include such co-housed rules engines and rules bases.

In a typical embodiment, illustrated here, client data processors 12a and 12b are employed by users to execute instantiations of applications 34. Likewise, in other embodiments, client data processors may also be used in development mode, e.g., by software engineers, test engineers, systems administrators, etc. (collectively, "developers") to develop, test and/or maintain existing or new software applications.

In a rules-based environment, as an alternative to or in addition to writing source code using traditional programming languages, developers and business analysts may create software applications by creating and updating simple forms to define rules that are used to derive execution instructions. This approach improves developer productivity, program modularity, and maintainability because users can work with easier, more familiar tools for application development rather than learning a new programming language or syntax. By way of non-limiting example, for any application used in business to automate work processing (e.g., a business process management application), users may work with forms to define rules for any of business logic, user interface, workflows and operations etc. for each type of work being automated through the use of the application. At run time during application execution, the rules engine 124 accesses appropriate rules for processing and generates executable code. A rule set may refer to a collection of rules and one or more rule sets may be part of a single application definition. Moreover, an application may comprise one or more components, modules, systems, and so forth (collectively, "components"), as is common in the art. Though, in the illustrated embodiment, applications 34 are defined by one or more rules 36 that are executed by the rules engine 124, in other embodiments the applications 34 may be defined and/or executed otherwise.

In operation, during execution of applications 34, rules engine 124 responds to signaling (e.g., received from the client devices such as in the form of HTTP requests), or otherwise, by processing rules 36 defining the applications 34. As mentioned above, the rules that define an application may include user interface rules for generating user interfaces (or component thereof) for transmittal to client devices for display (e.g., as static web pages) and/or execution (e.g., as Java scripts, Active X objects, or otherwise) by their respective browsers. It will be appreciated that although, in the illustrated embodiment, rules 36 (including user interface rules) are executed on the server for transmittal to the client devices, in other embodiments, those rules may be executed, instead or in addition, on the client devices directly. An example of a system and method that, among other things, can be used to process rules to generate a user interface is disclosed in the commonly assigned U.S. patent application Ser. No. 11/396,415, filed Mar. 30, 2006, entitled "User Interface Methods and Apparatus for Rules Processing," and U.S. patent application Ser. No. 12/035,682, filed Feb. 22, 2008, entitled "User Interface Methods and Apparatus for Rules Processing", both of which are incorporated herein by reference.

Systems and methods for use in embodiments of the techniques described herein facilitate efficient processing of static and dynamic content for client devices. This is depicted, by way of non-limiting example, in FIG. 2, in which client digital data processors 12a and 12b are shown receiving alternative data streams 40 and 41, respectively, —here, transmitted by server 16 upon processing of rules 36 in response to context-specific HTTP requests by browsers executing on the respective clients 12a, 12b.

In the foregoing regards, "context" refers to the context in which the requested data streams will be communicated to and executed on the client device. That context can include, by way of non-limiting example, user "properties" (e.g., security permissions, disability settings, age, locale, and so forth), client device 12a, 12b properties (e.g., processor speed, display size, keyboard capabilities, and so forth), and communication channel properties (e.g., the speed and type of connection between devices 12a, 12b and 16).

Among the rules being processed 36 on server 16 in response to the context-specific HTTP requests, two user interface rules 50, 51 are highlighted in FIG. 2. As previously mentioned, user interface rules support the presentation of data to operators who use client devices (e.g., 12a, 12b) to access and/or execute applications (e.g., enterprise-wide BPM applications, workflow systems etc.) on server 16. By way of non-limiting example, user interface rules may be used to define the contents, appearance and behavior of one or more user interfaces displayed on the client devices during the execution of the application. A single user interface rule may contain all of the necessary metadata, HTML code, Java Server Page (JSP) tags, directives etc. (collectively "source metadata") that is processed by the rules engine 124 to generate the data streams (e.g., 40, 41) for the user interface requested by client digital data processors (e.g., 12a, 12b). Alternatively, a user interface rule may incorporate other rules (e.g. a rule that defines the appearance of a single data element/property on a user interface comprising an input or display form) that together make up the source metadata for a particular user interface requested to be displayed/executed on a client digital data processor (e.g., 12a, 12b). Furthermore, user interface rules may also reference other files that define the static aspects of the user interface definition, such as, cascading style sheets, Java scripts, images, videos etc. (hereinafter "referenced files"). It will be appreciated that although, in the illustrated embodiment, these referenced files are not stored and/or processed as rules, in other embodiments, these files may be defined or identified as rules as well.

In the case of rules-based applications, a single rule (e.g. a user interface rule) can be unique to a specific application or it can be a generalized rule that is shared by multiple applications. For example, applications 34 may include a student loan processing application as well as a credit card dispute application where the rules are modeled or built in hierarchical classes following an object-oriented paradigm (much like Java). Although the rules defining those applications will generally differ, they may utilize a common rule or set of rules to define various screens (e.g., showing biographical information, such as Name, Contact Information, Income, Gender etc.) and/or processing sequences (e.g., payment or pay-off calculations) that can be inherited and used by multiple applications. In the case of object-oriented systems, such generalized or common user interface rules may contain reusable HTML text elements that are not dependant on a particular class, and thus, can be used across different class hierarchies.

The illustrated example 100 depicts further details of user interface rules 50, 51 incorporating referenced files, here, represented by image logo.gif and cascading style sheet style_a.css, using JSP tags in the source metadata. These referenced files may be stored on server 16, or on any other digital data processor or permanent storage medium that is in communication with server 16. Regardless of the storage location, these referenced files may be stored with metadata that provides descriptive information about the files. In one embodiment, this metadata includes the name of the file, as well as a content identifier (hereinafter "Content ID") that is automatically generated based upon the contents of the file at the time that it is created or updated. By way of non-limiting example, the Content ID may be a hash value (or another value having characteristics and other aspects similar thereto) which is based on (e.g., generated using) the current contents of the file. In one embodiment, the Content ID may be a hash value that is produced using a hash function (e.g., CRC32, MD5 etc.) on the contents of the referenced file at the time of Content ID generation. This hash value will change every time the contents of the referenced file are modified, thereby updating the Content ID of the file. Therefore, the Content ID may be more generally characterized as a fingerprint based on the file contents so that the Content ID may function as a unique identifier for that particular file contents at a point in time. In accordance with the foregoing, an embodiment may use a Content ID generated using the techniques described herein to differentiate between different versions of file contents at different points in time for the same file.

It will be appreciated that while other techniques of generating a unique Content ID for a referenced file are possible, a preferred embodiment may utilize a technique for generating a Content ID which minimizes the risk of inaccuracies. For example, the file modification date of a referenced file or a group of files may be used to generate the Content ID. However, the file management system generally provided with any digital data processor capable of storing files (e.g., 12a, 12b, 16), maintains the file modification dates by updating them any time the file is saved on the digital data processor. Therefore, a Content ID based upon the file modification date for a referenced file would be erroneously updated if an application program or a user re-saved the file on the digital data processor without modifying the content of the file.

In the illustrated embodiment, rules engine 124 is implemented in Java and uses an HTML/XML data structure. Therefore, the functionality of rules that are stored in the rules base 122 as metadata must be translated into Java, or other executable code, in order for the digital data processor 12a, 12b to execute the functionality defined by such rules. By way of non-limiting example, the source metadata for each of user interface rules 50, 51 may be a block of text (e.g., HTML or XML text) that contains JSP tags to incorporate referenced files logo.gif and cascading style sheet style_a.css, respectively. These text blocks defining the user interface rules are not directly executable by the browsers of client digital data processors 12a, 12b. Thus, the source metadata, including the JSP tags, directives and other server-side instructions specified in the source metadata must be processed by the rules engine 124 in view of the context-specific HTTP requests, in order to compose the final data streams 40, 41 that are transmitted back to the client digital data processors 12a, 12b, respectively. The resulting final data streams contain no JSP tags or directives and are executed by the browsers to display the requested user interfaces. It will be appreciated that although in the illustrated embodiment, the rules engine 124 is implemented in Java and utilizes an HTML/XML data structure, other embodiments of the rules engine may be implemented in any other programming language and utilize other data formats.

The web browsers are of the conventional type known in the art operative on the respective client devices 12a, 12b for, by way of example, retrieving user interfaces, presenting those user interfaces (visually, aurally, or otherwise), executing scripts, controls and other code on those user interfaces, accepting user input with respect to those user interfaces (e.g., for purposes of completing input fields), issuing HTTP requests with respect to those user interfaces or otherwise (e.g., for submitting to a server information from the completed input fields), and so forth. The user interfaces can be in HTML or other conventional forms, including embedded XML, scripts, controls, and so forth—again, per convention in the art.

In the illustrated example 100, rules 50 and 51 are implicated by the respective HTTP context-specific requests received by server 16 from the browsers executing on client digital data processor 12b and 12a, respectively. The rules engine 124 processes the source metadata for rule 50, as described previously, and converts the JSP tag 51a into an HTML <img> tag (i.e., image tag) 53 before including it in the data stream 41 that is sent to the browser executing on client 12b. Upon processing of the data stream 41 by the browser, the logo.gif image is embedded into the requested user interface for display by the browser. It will be appreciated that the <img> tag 53 does not physically insert the image file logo.gif into the final data stream 41 that is executed by the browser of 12b to display the requested user interface. Instead, the image tag 53 creates a link between the user interface and the image file such that the browser can retrieve the image file from the location specified by the corresponding src attribute of the <img> tag at the time the user interface is displayed in the browser. In element 53, the illustrated corresponding src attribute value of "webwb/images/1856884333/logo.gif" is dynamically generated by the rules engine 124 along with the complete <img> tag, and it is in the form of a file path containing the Content ID (i.e., 1856884333) of the logo.gif image file at the time when the file path is generated. As illustrated herein, a file path may identify a unique location in a file system and may have a general form specifying a file name along with a particular directory path in a hierarchical directory structure of one or more levels.

Thus, after sending the data stream 41 to client 12b to display the requested user interface for the first time in the browser of client 12b, the browser retrieves logo.gif image from server 16 (or from any other permanent storage location in communication with server 16 and client 12b) for display and stores the retrieved image file at the location specified by the file path in the local cache (i.e., browser cache or the local client cache memory) for quick access by client 12b. All subsequent requests for the same user interface result in the browser reusing the cached image at the same location. However, modification of the contents of the image logo.gif on server 16 results in an updated Content ID for the image. As mentioned above, the Content ID forms part of the dynamically generated file path that is incorporated into the final data stream 41 and that is used to specify the location for image retrieval. Therefore, an updated Content ID also results in an updated version of the final data stream 41 that is generated in response to subsequent requests from client 12b for the same user interface and that specifies a different location for image retrieval. Upon processing the updated version of the stream 41, the browser retrieves the updated image file from server 16 (or from any other permanent storage location in communication with server 16 and client 12b) when the same user interface is displayed in the browser for the first time after the image content is modified. Thereafter, like the older version of the image, the updated image is also stored in, and reused from, the local cache for client 12b until the contents of the image are modified again on server 16.

Similar to rule 50, the rules engine 124 processes the source metadata for rule 51 and dynamically converts the JSP tag 57 into HTML <link> tag 59, a markup format that is supported by the browser executing on digital data processor 12a to link the requested user interface and an external resource, here style_a.css. Per convention in the art, a corresponding href attribute value is used in connection with HTML <link> tag to specify the location of the linked resource. Accordingly as illustrated by element 59, the rules engine 124 dynamically generates the illustrated file path "webwb/css/13078359176/style_a.css" using the name and Content ID of the linked style sheet specified in the source metadata for rule 51. As described above, using this content-based file path to specify file retrieval location for style_a.css allows the browser executing on digital data processor 12a to retrieve and cache the style sheet in the same efficient manner as described above for logo.gif and the browser executing on client 12b.

As known in the art, a cascading style sheet (CSS) describes presentation or "look and feel" of a content document written in a markup language. CSS may be used to style content, for example, of web pages written in HTML, or any type of XML document. Using a CSS document enables separation of document content from document presentation including formatting, layout, colors, fonts, and the like.

It will be appreciated that although, style_a.css is not depicted in FIG. 2 as incorporating/referencing other files, in other embodiments, style sheets and any other referenced files may, in turn, reference, incorporate or link to other files. By way of non-limiting example, style_a.css may use an external image file to apply a background image to an element of the user interface displayed as a result of processing the source metadata of rule 51. In one embodiment, if the external image is updated, the Content IDs for both the image file and the cascading style sheet style_a.css may be updated. However, a change to the contents of the style sheet without modification to the contents of the referenced external image file may result in an update to the Content ID for the style sheet without an update to the Content ID for the external image. Thus, more generally, a change to a first referenced file may cause the Content ID of the first referenced file to be updated as well as the Content ID for another second file which links to (or references) the first referenced file. However, a change to the foregoing second file without modification to the first referenced file may cause only the Content ID of the second file to change without affecting the Content ID of the first file. The foregoing may be more generally applied for use with one or more levels of nested file referencing or linking (e.g., first file references second file, second file references third file, and so on) so that any change to a referenced file may cause a change to a Content ID for any other file which links, directly or indirectly, to the referenced file.

In a second embodiment in connection with the foregoing example, the style sheet may have a first Content ID determined using (or more generally dependent upon) the contents of both the style sheet and the external image referenced therein. The external image may have a second Content ID which is also determined using (or more generally dependent upon) the contents of both the style sheet and the external image. In this second embodiment, both the first Content ID and second Content ID will be the same. Additionally, a change to the contents of any of the style sheet or referenced image results in a change to both the first Content ID and the second Content ID. Thus, more generally, a change to any of a first referenced file and a second file which links to, or references, the first file may cause the Content ID of the first referenced file to be updated as well as another content ID for second file which links to (or references) the first referenced file, where the foregoing Content IDs associated with the first and second files are based on the same content.

Similarly, a rules-based application (e.g. 34) may use multiple static files (e.g., JavaScript or CSS files) that are always, or almost always, needed together to support a browser display or function. In order to reduce network traffic and user response times, developers may decide to create a static content bundle rule that groups together these multiple files that the server 16 transmits to workstation (e.g., 12a, 12b) browsers as a single unit or "bundle." In this situation, if any of the static files are updated, the Content IDs of both the updated files, as well as the bundle are changed accordingly.

In connection with the foregoing, consider an example with a single unit or bundle comprising three static files. Each of the three files in the bundle may have its own Content ID. Additionally, there may be a fourth Content ID which collectively represents that of the bundle. In one embodiment, a change to a first of the three files causes the Content ID of the first file and the fourth Content ID of the bundle to change without causing the Content IDs for the remaining two files to change.

Figure 3:
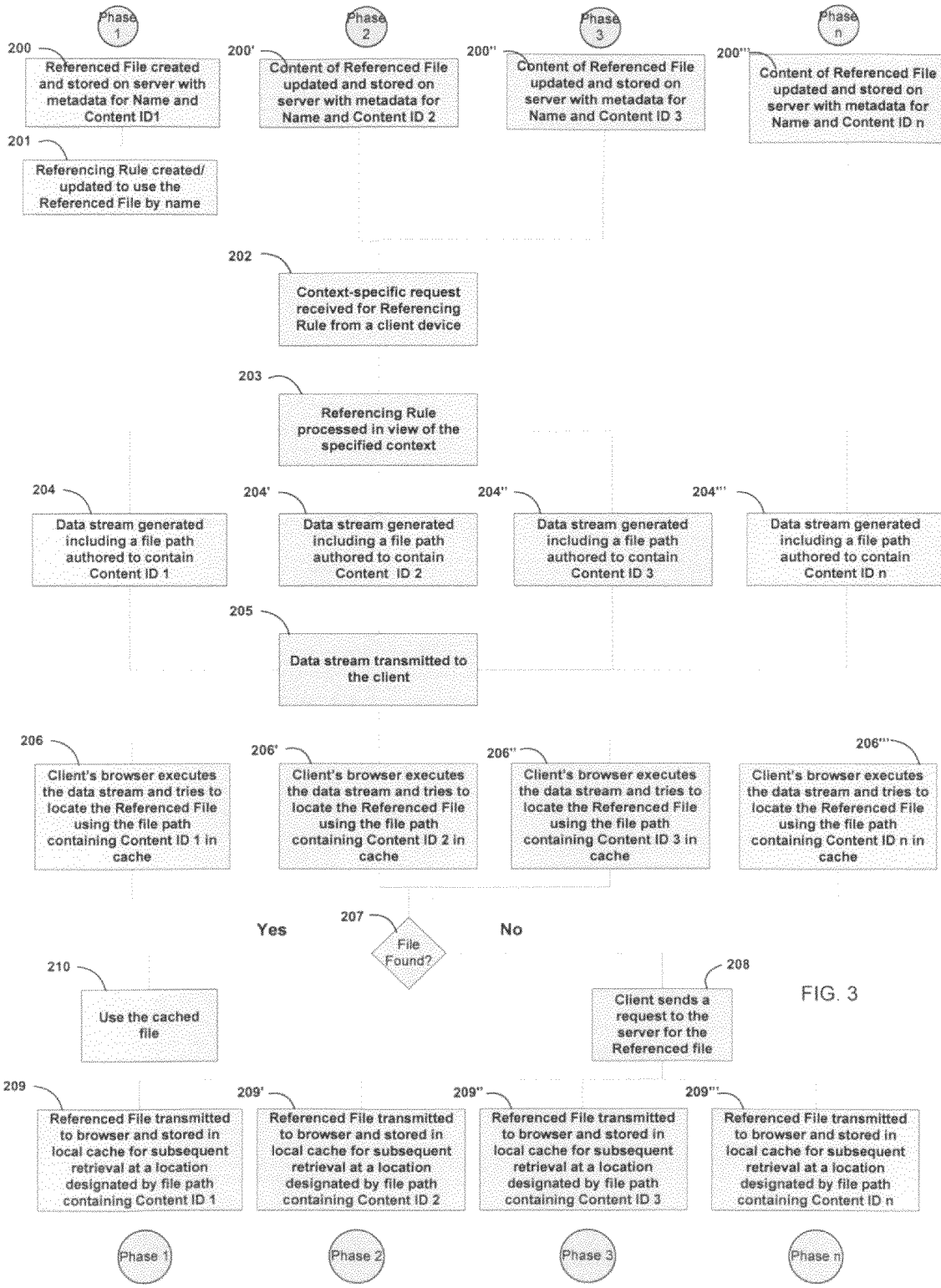
FIG. 3 illustrates an exemplary process flow for use in connection with techniques described herein.

FIG. 3 illustrates an exemplary process flow for use with an embodiment in accordance with techniques described herein. In order to assist in understanding the techniques herein, the processing steps are shown in a particular order during different points in time that are depicted as phases 1 through n. However, one skilled in the art will recognize that the order of execution of these steps may change and execution of steps during multiple phases is not a requirement of an embodiment in accordance with techniques described herein.

At a first point in time during step 200 of phase 1, a referenced file (such as, for example, an image, a video or a style sheet) is created and stored on a server (e.g., 16) containing metadata that specifies the name of the referenced file as well as a Content ID. The file name may be supplied by the user or system that creates the referenced file. However, the Content ID is automatically generated based upon the contents of the file at that point in time during phase 1. As mentioned above, a checksum of the bytes of data of the referenced file may be converted into a hash value and stored as the Content ID. Still other techniques of generating a unique Content ID reflecting the contents of the referenced file at a particular point in time are possible.

In step 201 of phase 1, a new referencing rule may be created and/or an existing referencing rule may be updated to incorporate the referenced file by name. By way of non-limiting example, a referencing rule may be a user interface rule (e.g., rule 50) that defines the overall layout and configuration of a main user portal for a business process application. As part of the user interface for this portal, the company logo for the organization using that application may be included in the overall layout by way of the referencing rule including a reference to the logo.gif file (i.e. referenced file for the company logo image) as shown in FIG. 2.

At runtime, a context-specific request (as previously described) is received for the first time from a client device (e.g., 12a, 12b) for the referencing rule in step 202 of phase 1. In response to the request, the rules engine 124 processes the source metadata of the referencing rule in step 203. As a result of such rule processing, a data stream (e.g., 41) including a file path that contains the Content ID of the referenced file is generated and transmitted to the requesting client device in steps 204 and 205 of phase 1.

Upon receiving and executing the dynamically generated data stream in step 206 of phase 1, the requesting client's browser tries to retrieve the referenced file from the local cache memory at the location specified by the file path. However, since the referenced file is requested for the first time in phase 1 and not previously stored in local cache for fast access, the browser of the requesting client sends another request to the server to retrieve the referenced file in steps 207 and 208 of phase 1. It should be noted that the client request sent to the server to retrieve the contents of the referenced file may identify the referenced file using the file path. On the server, the particular version of the file whose contents is requested may be stored in a server-side location which is identified by the file path. The server-side location may correspond to the same location as identified by the file path in the client's local cache. The server-side location may also be any other location that may be determined by the server such as, for example, where the server maps the file path to a different server-side location for the contents of the referenced file.

Finally in step 209, the referenced file is retrieved by the client's browser for display/execution and it is simultaneously stored in the local cache memory for faster access. As long as the content of the referenced file is not updated on the server, the browser will continue to reuse the same cached file for all subsequent requests that implicate that referenced file.

Phases 2-*n* represent different points in time after phase 1 when the content of the referenced file is updated on the server during each of steps 200', 200" and 200'", respectively. At the end of each of these steps, a unique Content ID is generated and stored based upon the updated content of the underlying referenced file. Thereafter, the client-server communication for the request and processing of the referencing rule during each phase is identical, except the different file paths that are dynamically generated in each of steps 204', 204" and 204' to include the respectively updated unique Content ID based on the contents of the referenced file at the time of file path generation. As a result of the new file path specifying a new location for referenced file retrieval in each of the phases 2-*n*, the client's browser is unable to reuse the previously cached copy on the client that is stored at a different location for phase 1. Thus, the browser is forced to retrieve the updated referenced file from the server just once in between updates.

In one embodiment, contents of the local cache for client digital data processors (e.g., 12*a*, 12*b*) do not expire or refresh frequently after a pre-specified period of time (e.g., every 24 hours). Instead, all copies of the referenced files (e.g., Content ID 1-*n* of FIG. 3) may be stored in the local cache over a much longer period of time, or even permanently. This results in greater accuracy and flexibility during data processing because the users and applications can always access the most updated information while retaining the ability to seamlessly switch between different versions of the cached referenced files, if necessary.

In the example given above in FIG. 2, assume that the particular user interface generated by processing rule 50 for versions 1 and 2 of application 34 links to the same image file, logo.gif, with a background color of blue. Once the image is initially retrieved and stored in local cache, users with access privileges for either version of application 34 will reuse the same single cached copy of the image at the same file path. Now assume that the user interface for version 2 of the application 34 is subsequently linked to a second version of logo.gif with a pink background. In that case, users with version 1 access privileges will continue to reuse the original single cached copy of the image (having the blue background) from the same location. However, the updated pink image from server 16 (or from any other permanent storage location in communication with server 16 and client 12*b*) is retrieved only once for version 2 users before it is also cached for reuse. Thereafter, any user with access to both versions of the application 34 can switch efficiently between the blue and pink displays by reusing the two cached images as opposed to retrieving additional files or resources over a slower network connection.

In accordance with the techniques described herein, an embodiment may minimize network traffic by using the content-based caching during development and execution of software applications 34. However, data still has to be retrieved from the server (possibly, over a very slow network connection) each time one or more referenced files are updated. This may severely impact system performance in situations where there are a large number of users requesting the updated file.

In order to further improve performance, techniques described herein may be employed in a digital data processing environment that utilizes one or more edge servers or content servers as will now be described with reference to FIG. 4.

Figure 4:
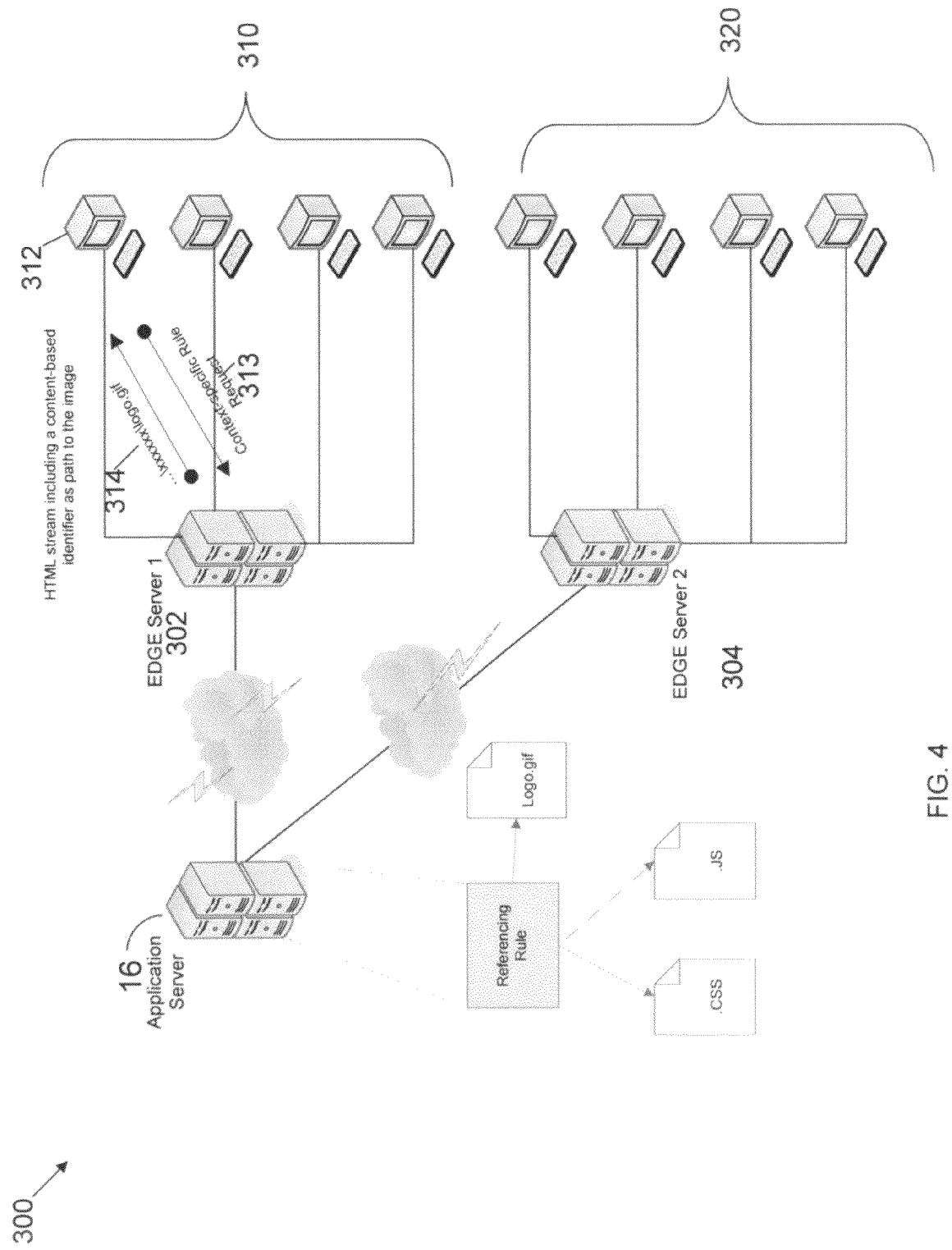
FIG. 4 depicts an exemplary system architecture that may be used in connection with techniques described herein.

The example 300 depicted in FIG. 4 includes edge servers 302, 304 and application server 16 being used to service client requests. It should be noted that application server 16 of FIG. 4 may be similar to the server 16 described in connection with FIG. 2 with the exception that the static content, in whole or in part, may be stored on edge servers. Each edge server may be acting as a data element source storing a complete or partial copy of the foregoing static content, such that, each edge server is able to provide a copy of the static data when requested as opposed to retrieving it from the application server 16. This not only helps minimize the load on the application server, but also helps distribute the work load for static content requests among the plurality of edge servers 302, 304. The edge server 302 may handle requests from a first set of clients 310 and the edge server 304 may handle requests from a second set of clients 320. Although FIG. 4 includes only 2 edge servers, it will be appreciated that an embodiment may include any varying number of edge servers distributed throughout various network locations.

The edge servers 302, 304 may store all of the static content (e.g., CSS files, js files and images) while the application server 16 stores and processes the dynamic content (e.g., user interface rules). In one embodiment using edge servers, connection requests from a user interfacing with a client (e.g. any of client digital data processors 310) may be directed to an edge server. For example, a user interfacing with client 312 may issue a context-specific HTTP request 313 which is received by the edge server 302. In response to receiving the context-specific HTTP request 313, the edge server 302 may redirect the request to the application server 16 for dynamic rules processing as described previously in connection with FIG. 2. As a result of such processing, application server 16 generates data streams (e.g., denoted 40, 41 of FIG. 2 and 314 of FIG. 4) that are transmitted back to the requesting client device 312 via the intervening edge server 302. For user interface rules that reference static content stored on the edge server, the data streams are rendered on the client devices such that the edge server is specified as the target for static content retrieval. This may help improve system performance, for example, if the static content can be retrieved over a faster network connection from an edge server that is geographically located in closer proximity to the requesting client devices than the application server 16. Furthermore, similar to the local cache or the browser cache on the client, the edge server may also cache data to reduce the overall load placed on the application server 16.

It should be noted that the edge servers 302, 304 may also be referred to as content servers serving static content. An embodiment utilizing edge servers may provide a connection between a client and one of the edge servers in a variety of different ways. For example, in one embodiment as described above, the client may directly forward a request to a particular edge server. In another embodiment, the client request may be initially directed to a gateway or proxy server which then, in turn, redirects the request to a particular edge server based upon certain selection criteria (e.g., such as based on edge server load balancing, client-edge server electronic proximity etc.). The edge server may then communicate with the application server as described above. Thus, in this latter embodiment, the process of redirection, edge server selection, and the like, may be transparent and automatic in response to receiving the client request. In yet another embodiment, the client may first contact the application server directly and receive the dynamically generated data stream (e.g., such as 40, 41 of FIG. 2). As part of the rule processing, the application server may select one of the edge servers to serve static content to the client and the generated data stream may include an identifier formed using a content-based file path with other information identifying the particular edge server. At a second point in time, the client may request the content by specifying the identifier and sending the request for content directly to the edge server.

Described above are techniques for dynamically generating a file path that can be used to specify a location of content to be retrieved from local cache memory. The content may be initially retrieved from a permanent storage location or data element source, such as an application server, and then cached locally at the location specified by the file path for use by a client-side browser in connection with subsequent requests for the same content. As described previously, the generated file path may be 'content-based' in the sense that the file path includes a Content ID that is determined as a function of the content at a particular point in time. As an example, a Content ID may be a hash value based on the bits of data that is stored in a file or that is otherwise used in caching. Accordingly, the Content ID only changes if the content is updated.

For the sake of simplicity, the content-based file path (i.e., including the Content ID) may be more generally referred to as a data element identifier for a data element (e.g. a file, any portion of data stored within a file, data stored permanently or temporarily as a cached element). The data element identifier may just include the Content ID, or it may also include other information to form the entire data element identifier. By way of non-limiting example, an embodiment may form a content-based file path that specifies a directory path through one or more levels of a directory structure. A first portion of the file path may contain the Content ID of the data element and one or more other portions of the file path may be formed (and may vary) based on information stored as metadata with the data element (e.g., file name), or information specified in a HTTP context-specific request for the data element (e.g., as illustrated in FIG. 2).

It will be appreciated that an embodiment may also utilize a data element identifier which is not in the form of a file path but specifies, for example, only a file name or other location in a flat, non-hierarchical manner (e.g., an embodiment utilizing a flat file system rather than a hierarchical directory structure for the cached locations). In this case, an embodiment may form the data element identifier specifying a file name without any directory information and the data element identifier may consist solely of the Content ID.

The exemplary embodiments described herein utilize techniques in forming a content-based data element identifier for use with content that may be characterized as static. A file, such as an image file, may be static in the sense that the file may be stored at a point in time and then later retrieved for use in response to a received request, cached at one or more clients, edge servers, and the like. In that embodiment, the contents of the file (i.e., the data element) may be characterized as static because they are not dynamically generated in an automated fashion. In contrast, a data element may be characterized as dynamic if at least a portion of the contents of the data element are generated dynamically in an automated fashion, such as, in response to receiving a HTTP request for the data element.

Systems and methods for use in embodiments of the techniques described herein facilitate using a content based data element identifier for efficient processing of content that may be characterized as static or dynamic, as described above. The example in FIG. 2 depicts one embodiment where content based data element identifiers (i.e. the file paths contained within the <img> and <link>tags 53, 59, respectively) are used to efficiently retrieve and cache the static files (i.e., logo.gif and style_a.css). However, in another embodiment, the dynamically generated data streams 40, 41 may also be stored, cached and retrieved in the same manner as the static files that are referenced by the data streams. By way of non-limiting example, the data streams 40 and 41 may represent two distinct web pages that are dynamically generated by server 16 in response to context-specific HTTP requests by browsers executing on the respective clients 12a, 12b. As mentioned above, the data streams 40, 41 are generated by processing the source metadata of the rules 36 implicated in view of the context specified in the HTTP requests. If the data streams 40, 41 and the corresponding web pages do not change across multiple users or clients for a particular context, the server 16 may also store or cache a copy of the data streams 40, 41 at a cached location in accordance with an associated data element identifier (e.g., including Content ID and/or file name) for the dynamically generated content. Thereafter, the server may reuse the cached data streams for subsequent HTTP requests specifying the same context for the same web pages, instead of going through the process of converting source metadata of the implicated rules 36 into data streams 40, 41 for each request. Furthermore, the data streams 40, 41 and corresponding web pages may also be stored locally in the client or browser cache, along with the referenced static content, for even faster response times. Still other techniques for the efficient generation and processing of data through the use of data element identifiers are possible.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method for caching comprising:

performing first processing in response to a client failing to retrieve contents of a data element from a cache location specified by a first data element identifier including a first content identifier determined based upon the contents of the data element at a first point in time, said first processing including obtaining the contents of the data element from a data element source and storing the contents of the data element at a cache location specified by the first data element identifier;

updating the contents of the data element at a second point in time to create a second contents of the data element and storing the second contents of the data element at the second point in time in the data element source, said data element at said second point in time having a second content identifier determined based on the second contents of the data element at the second point in time; and performing second processing in response to the client failing to retrieve the second contents of the data element from a cache location specified by a second data element identifier including the second content identifier, said second processing including obtaining the second contents of the data element from the data element source, and storing the second contents of the data element at a cache location specified by the second data element identifier.

2. The method of claim 1, wherein third processing is performed each time the client fails to retrieve contents for a version of the data element from a cache location specified by an associated data element identifier, said third processing comprising:

obtaining contents for said version of the data element from the data element source; and storing said contents for said version at the cache location specified by the associated data element identifier, wherein the associated data element identifier includes an associated content identifier determined based upon the contents of the version of the data element.

3. The method of claim 1, further comprising:

storing, at the first point in time, the contents of the data element and associated metadata including at least the first content identifier;

forming the first data element identifier including the first content identifier in response to receiving a request from the client; and sending a data stream including at least the first data element identifier to said client, wherein said sending occurs prior to said client failing to retrieve the contents of the data element from a cache location specified by the first data element identifier.

4. The method of claim 3, wherein the associated metadata includes a file name, and said first data element identifier is a file path containing the file name.

5. The method of claim 1, wherein at least the first data element identifier includes a portion determined using context information associated with a received request from the client, said first data element identifier being included in a data stream generated in response to the received request.

6. The method of claim 5, wherein the context information includes at least one of a user property associated with a user on behalf of which the received request is issued, a device property associated with a device from which the received request is issued, and a communication channel property.

7. The method of claim 6, wherein the user property is any of security permissions, a disability setting, and locale of the user.

8. The method of claim 6, wherein the device property is any of processor speed, display size, and a keyboard capability.

9. The method of claim 6, wherein the communication channel property is a property of a channel over which the received request is transmitted and includes any of connection speed and connection type between any of the device, the data element source and the cache location.

10. The method of claim 1, wherein the data element source is a storage location on a server.

11. The method of claim 1, wherein at least the first content identifier is a hash value based on the contents of the data element at the first point in time.

12. A computer-implemented method for processing requests received by a server comprising:

processing at a first point in time, in response to receiving a request from a client, one or more rules using a rules engine executing on the server;

generating, as a result of processing the one or more rules, a data stream including a first data element identifier for a data element referenced by the one or more rules, wherein the first data element identifier includes a first content identifier determined based upon contents of the data element at the first point in time;

transmitting the data stream to the client wherein the client subsequently attempts to obtain the data element from a cache location specified by the first data element identifier;

performing first processing in response to the client failing to obtain the contents of the data element from the cache location specified by the first data element identifier, said first processing including retrieving the contents of the data element from a data element source, transmitting the contents of the data element to the client, and storing the contents of the data element at the cache location specified by the first data element identifier;

updating the contents of the data element at a second point in time to create a second contents of the data element and storing second contents of the data element at the second point in time in the data element source, said data element at said second point in time having a second content identifier determined based on the contents of the data element at the second point in time; and performing second processing in response to the client failing to obtain the second contents of the data element from a cache location specified by a second data element identifier including the second content identifier, said second processing including retrieving the second contents of the data element from the data element source, transmitting the second contents of the data element to the client, and storing the second contents of the data element at the cache location specified by the second data element identifier.

13. The method of claim 12, wherein metadata associated with the data element is stored in the data element source along with the contents of the data element.

14. The method of claim 13, wherein the metadata associated with the data element includes a file name, and any of said first and second data element identifiers is a file path containing the file name.

15. The method of claim 12, wherein the data element at the first point in time includes a reference to a second data element, said reference specifying a third data element identifier including a third content identifier determined based upon contents of the second data element at the first point in time and the method comprising performing third processing in response to the client failing to obtain the contents of the second data element from a cache location specified by the third data element identifier, said third processing including retrieving the contents of the second data element from the data element source, transmitting the contents of the second data element to the client, and storing the contents of the data element at the cache location specified by the third data element identifier.

16. The method of claim 15, wherein, if the contents of the second data element are modified at a particular point in time, the third content identifier and the third data element identifier accordingly change based on modifications to the contents of the second data element at the particular point in time.

17. The method of claim 15, wherein, the third content identifier does not change despite updating the contents of the data element at the second point in time.

18. The method of claim 12, wherein at least one of the one or more rules references a content bundle, said content bundle referencing a plurality of data elements including said data element.

19. The method of claim 18, wherein contents for each of the plurality of data elements is stored in the data element source along with a corresponding content identifier determined based upon contents of said each data element at a particular point in time, and wherein another content identifier is associated with the content bundle, said another content identifier having a value determined based upon contents of said plurality of data elements.

20. The method of claim 19, wherein if the contents of any one of said plurality of data elements are modified, said another content identifier changes accordingly along with the corresponding content identifier that is based upon the contents that are modified.

21. The method of claim 12, wherein the contents of the data element comprise static contents.

22. The method of claim 21, wherein the data element source comprises any of one or more content servers and edge servers.

23. The method of claim 21, wherein any of the cache location specified by the first data element identifier and the cache location specified by the second data element identifier comprise locations on any of one or more content servers and edge servers.

24. The method of claim 22, wherein a first of said one or more content servers or edge servers receives the request from the client and the processing at the first point in time is performed by the server in response to the first of said one or more content, or edge servers transmitting the request to the server.

25. The method of claim 22, wherein the server comprises an application server, said application server returning said data stream to a first of said one or more content servers or edge servers, said data stream then being transmitted to the client.

26. The method of claim 12, wherein at least a portion of the contents of the data element is dynamically generated in response to the request from the client.

27. The method of claim 21, wherein the data element is any of a script, an image file, a video file, and a cascading style sheet.

28. The method of claim 12, wherein said data stream includes contents of a web page.

29. The method of claim 28, wherein said web page is associated with a web page content identifier determined based upon the contents of the web page when said data stream is generated, and said web page is stored at a cache location specified by a web page location identifier including said web page content identifier.

30. A computer implemented method for caching comprising:
  storing, at a first point in time, contents of a data element and associated metadata at a data element source, said associated metadata including a file name and a first content identifier based upon the contents of the data element at the first point in time;
  determining whether the data element is stored at a cache location identified by a first data element identifier, the first data element identifier including the first content identifier and the file name;
  performing first processing in response to determining that the data element is not stored at the cache location identified by the first data element identifier, said first processing including obtaining the contents of the data element from the data element source and storing the contents of the data element at the cache location specified by the first data element identifier;
  updating the contents of the data element at a second point in time to create updated contents;
  storing, at the data element source, updated contents of the data element at the second point in time and associated metadata including the file name and a second content identifier based on the updated contents of the data element at the second point in time;
  determining whether the data element is stored at a cache location identified by a second data element identifier, the second data element identifier including the second content identifier and the file name; and
  performing second processing in response to determining that the data element is not stored at the cache location identified by the second data element identifier, said second processing including obtaining the updated contents of the data element from the data element source and storing the updated contents of the data element at the cache location specified by the second data element identifier.

31. A non-transitory computer readable medium comprising executable code stored thereon for data processing and caching, the computer readable medium comprising executable code stored thereon that:
  perform first processing in response to a client failing to retrieve contents of a data element from a cache location specified by a first data element identifier including a first content identifier determined based upon the contents of the data element at a first point in time, said first processing including obtaining the contents of the data element from a data element source and storing the contents of the data element at a cache location specified by the first data element identifier;
  update the contents of the data element at a second point in time to create a second contents of the data element and store the second contents of the data element at the second point in time in the data element source, said data element at said second point in time having a second content identifier determined based on the second contents of the data element at the second point in time; and
  perform second processing in response to the client failing to retrieve the second contents of the data element from a cache location specified by a second data element identifier including the second content identifier, said second processing including obtaining the second contents of the data element from the data element source, and storing the second contents of the data element at a cache location specified by the second data element identifier.

32. A non-transitory computer readable medium comprising executable code stored thereon for processing requests received by a server, the computer readable medium comprising executable code stored that:
  process at a first point in time, in response to receiving a request from a client, one or more rules using a rules engine executing on the server;
  generate, as a result of processing the one or more rules, a data stream including a first data element identifier for a data element referenced by the one or more rules, wherein the first data element identifier includes a first content identifier determined based upon contents of the data element at the first point in time;
  transmit the data stream to the client wherein the client subsequently attempts to obtain the data element from a cache location specified by the first data element identifier;
  perform first processing in response to the client failing to obtain the contents of the data element from the cache location specified by the first data element identifier, said first processing including retrieving the contents of the data element from a data element source, transmitting the contents of the data element to the client, and storing the contents of the data element at the cache location specified by the first data element identifier;
  update the contents of the data element at a second point in time to create a second contents of the data element and store the second contents of the data element at the second point in time in the data element source, said data element at said second point in time having a second content identifier determined based on the contents of the data element at the second point in time; and perforin second processing in response to the client failing to obtain the second contents of the data element from a cache location specified by a second data element identifier including the second content identifier, said second processing including retrieving the second contents of the data element from the data element source, transmitting the second contents of the data element to the client, and storing the second contents of the data element at the cache location specified by the second data element identifier.

* * * * *